Feb. 9, 1932.   W. J. FIEGEL   1,844,466
TURNOVER FOR MOLDING MACHINES
Filed Nov. 24, 1930   4 Sheets-Sheet 2

INVENTOR.
William J. Fiegel
BY Whittemore Hulbert
Whittemore Belknap
ATTORNEYS

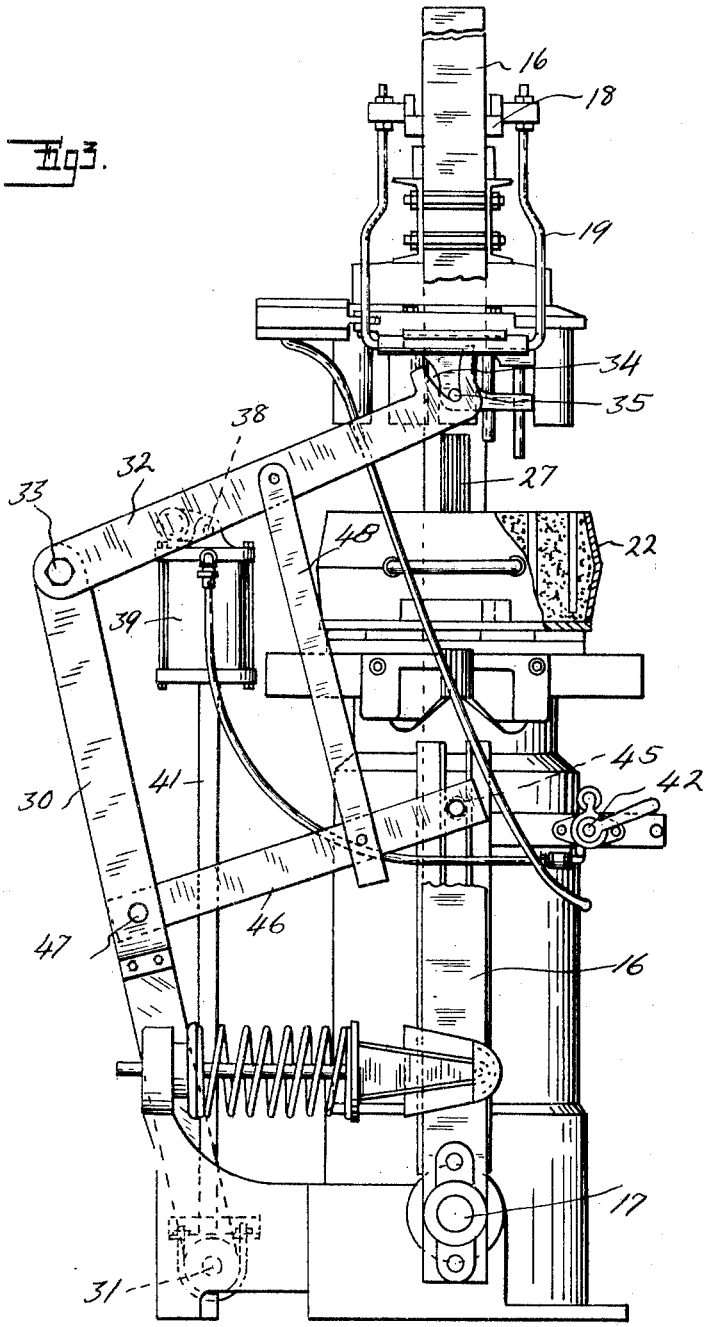

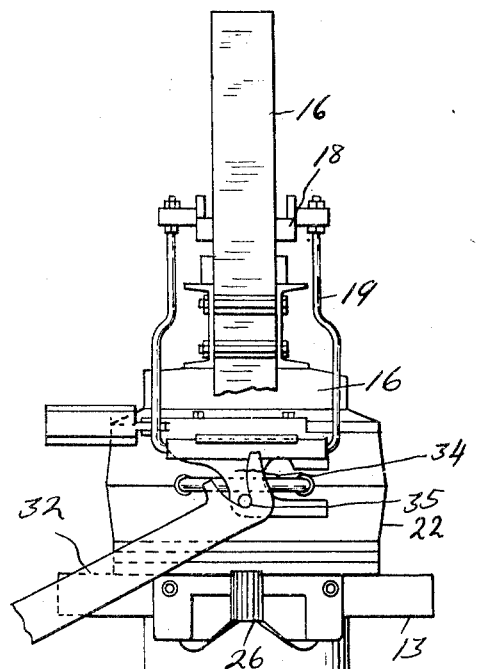
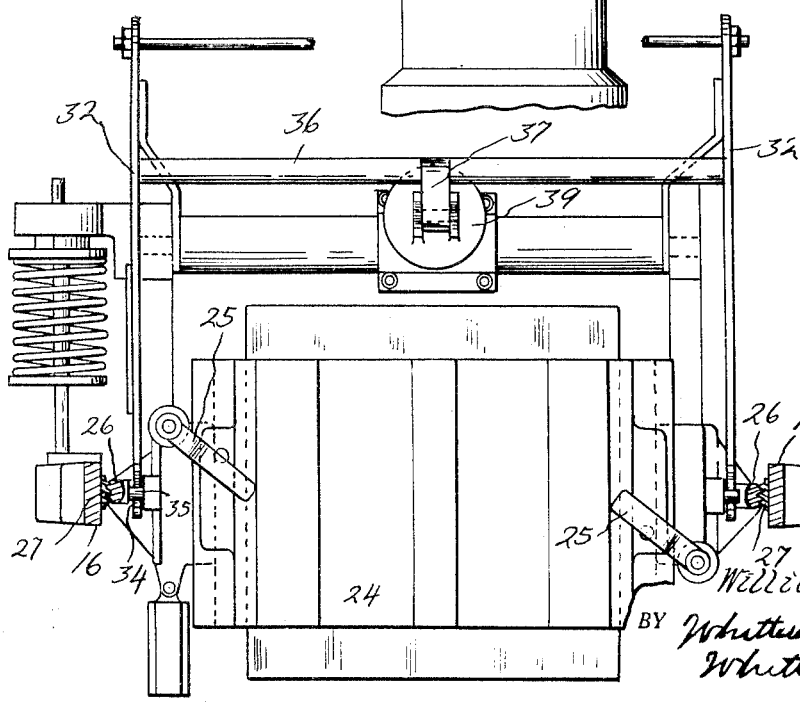

Patented Feb. 9, 1932

1,844,466

UNITED STATES PATENT OFFICE

WILLIAM J. FIEGEL, OF DETROIT, MICHIGAN, ASSIGNOR TO BOHN ALUMINUM & BRASS CORPORATION, OF DETROIT, MICHIGAN, A CORPORATION OF MICHIGAN

TURNOVER FOR MOLDING MACHINES

Application filed November 24, 1930. Serial No. 497,933.

This invention relates to molding machines and has as one of its objects to reduce the manual effort required in operating machines of this type to a minimum.

The invention contemplates accomplishing the above result by providing mechanical means for automatically raising the mold from its support to permit rotating the same to position the pattern uppermost where it may be conveniently grasped and removed from the mold prior to the pouring operation.

The foregoing as well as other objects will be made more apparent as this description proceeds, especially when considered in connection with the accompanying drawings, wherein:

Figure 3 is a view similar to Figure 2 showing the parts of the molding machine in a different position;

Figure 4 is a fragmentary side elevational view of the machine illustrating the parts thereof in still another position; and Figure 5 is a sectional view taken substantially on the line 5—5 of Figure 1.

For the purpose of illustration, I have shown this invention as applied to a molding machine similar in basic principle to the machine illustrated in my Patent No. 1,692,-204 issued November 20, 1928. The addition or improvement in the machine illustrated in the aforesaid patent and constituting the subject matter of this invention comprises generally means for automatically raising the mold after the ramming operation from its support to a position where it may be readily rotated throughout 180 degrees for placing the pattern therein uppermost to permit the same to be withdrawn from the mold.

Figure 1:
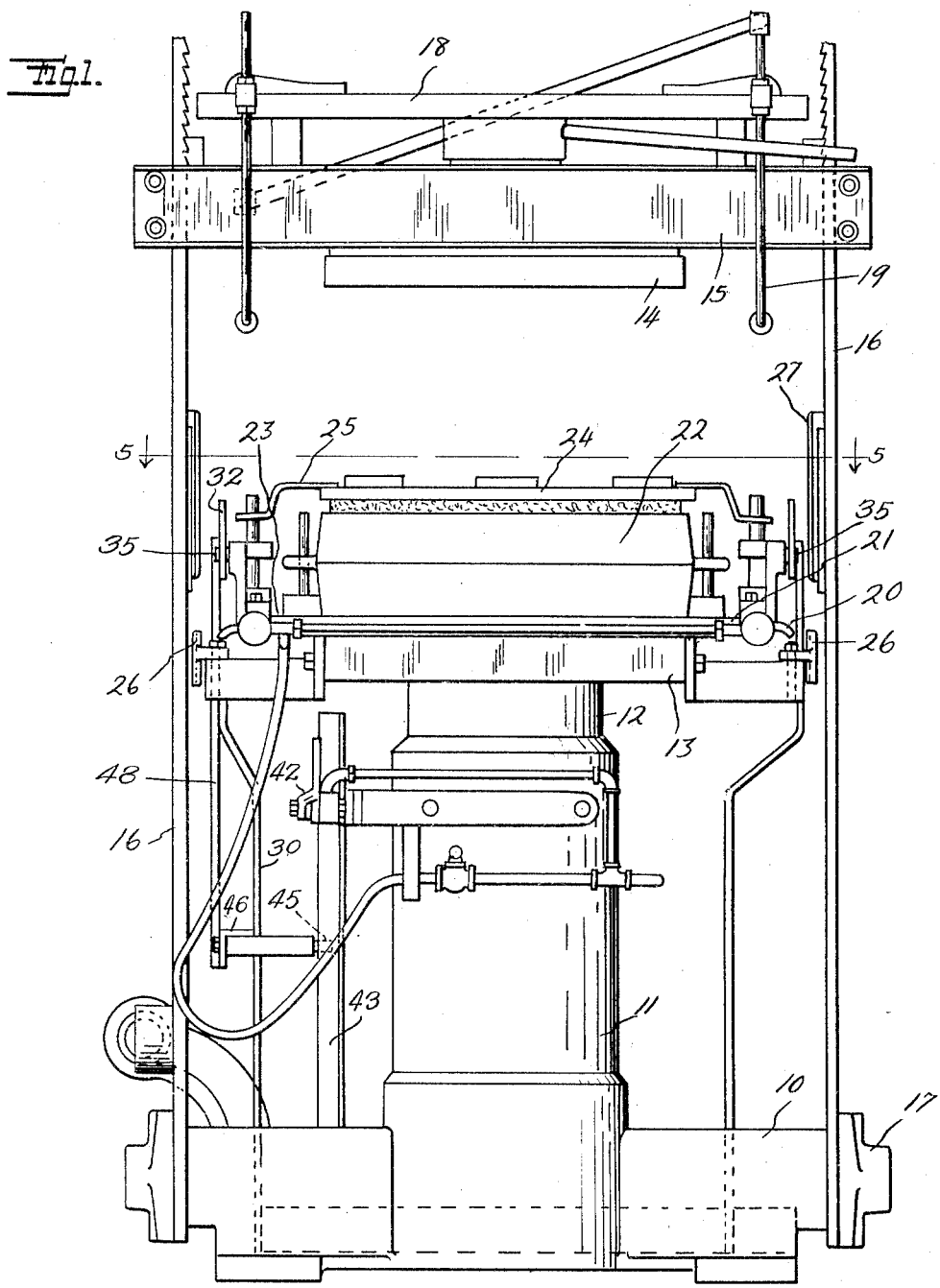
Figure 1 is an elevation of a molding machine constructed in accordance with this invention.

In order to facilitate an understanding of the present invention, the molding machine and operation thereof will now be briefly described. As shown particularly in Figure 1, the molding machine comprises a base 10 supporting a housing 11 within which a ram 12 is mounted for reciprocation in a direction substantially perpendicular to the horizontal. The ram 12 is preferably operated by air pressure admitted to the housing 11 below the ram 12 by suitable valve means not shown herein. The arrangement is such that the admission of air into the housing 11 below the ram 12 builds up a pressure sufficient to raise the ram and the escape of air from the housing 11 causes the ram to descend at a speed in accordance with the rate of escape of the air. Supported upon the top of the ram 12 is a pattern supporting plate 13 adapted to cooperate with a squeezer plate 14 to clamp the mold therebetween when the parts are in the position illustrated in Figure 4. The squeezer plate 14 is carried by a frame member 15 which in turn is secured at the opposite ends thereof to a pair of side frame members 16 pivotally connected at the lower ends thereof upon opposite sides of the base of the machine as indicated by the reference character 17.

Supported upon the frame member 15 above the squeezer plate 14 is a vertically adjustable cross head 18 carrying adjacent the opposite ends thereof a pair of mold part-engaging elements 19. The mold part-engaging elements 19 are substantially U-shaped in cross section and are rockably mounted for swinging movement about a horizontal axis so that the lower loop ends of the elements may be engaged with the ears 20 projecting laterally outwardly from opposite sides of the pattern plate 21.

Figure 2:
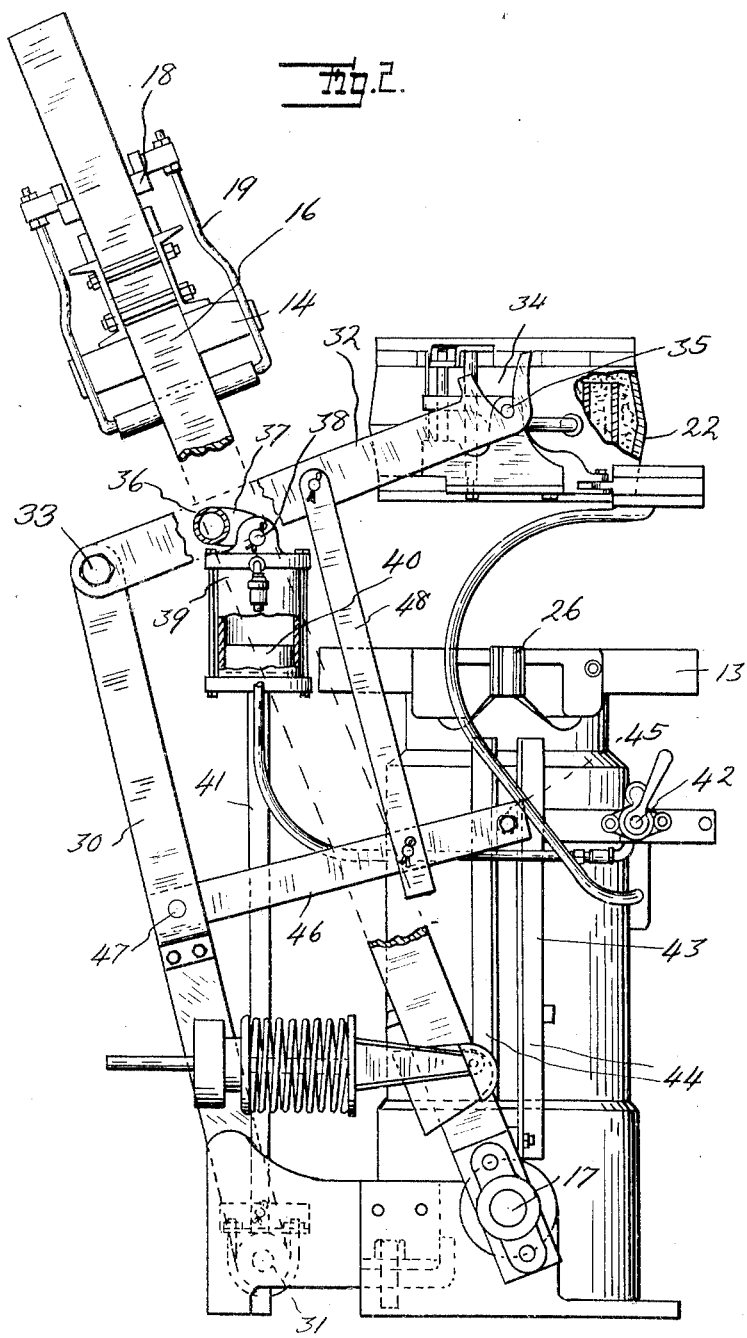
Figure 2 is a side elevational view of the machine illustrated in Figure 1 with certain parts broken away for the sake of clearness.

Referring now to the operation of the molding machine as thus far described and assuming that the swinging frame members 16 and their associated parts are in the position shown in Figure 2 and the ram 12 is in its lowermost position as also shown in this figure. When the parts of the machine are in the above positions, a pattern plate 21 is placed upon the plate 13 and a flask 22 is placed upon the pattern plate 21. When the pattern plate and flask are properly positioned as specified above, sand or other suitable molding material is inserted within the flask around the pattern and the parts are agitated by a suitable air operated vibrator 23. Sufficient sand is placed within the flask to bring the top surface thereof substantially above the upper edge portions of the flask as clearly shown in Figure 1 of the drawings. After sufficient sand has been inserted within the flask 22, a mold board 24 of suitable construction is placed upon the top surface of the sand and held in position by means of suitable clamps 25 engaging opposite ends of the mold board. The swinging frame 16 is then moved to its upright position and air is admitted to the housing 11 below the ram 12 for moving the latter upwardly to cause the mold board 24 to engage the squeezer plate 14. In this connection it is to be noted that during upward movement of the ram toward the squeezer plate 14, the guide members 26 projecting laterally outwardly from opposite sides of the plate 13, engage cooperating guide members 27 secured to the inner sides of the swinging frame members 16. The form of engagement is such that the frame members 16 are locked in their upright position to insure proper engagement of the mold with the squeezer plate 14. After the ram 12 has been moved upwardly a sufficient distance to compress the sand within the flask 22, the air in the housing 11 below the ram 12 is permitted to escape, thereby causing the ram to descend. The ram is lowered until the guide members 26 disengage from their cooperating guide members 27 at which time the swinging frame members 16 are swung to the position shown in Figure 2 so as to be out of the way for subsequent operations. The flask 22 is then inverted upon the plate 13 so as to position the pattern plate uppermost to permit withdrawal of the same from the sand. Upon completion of the inverting operation, the swinging frame members 16 are again moved to their operative position and the ram 12 is again moved upwardly by admitting air into the housing 11. When the ram has reached its uppermost position, as shown in Figure 4, the elements 19 are manipulated to engage beneath the ears 20 on the pattern plate and the ram is caused to descend at a relatively slow rate of speed with the result that the pattern will be withdrawn from the sand. In this connection it is to be noted that the length of the guide members 27 is so determined that the cooperating guide members 26 will be maintained in engagement therewith during the descent of the ram to withdraw the pattern with the result that the swinging frame members 16 will be held in a rigid position relative to the flask during the withdrawing operation.

It will be noted from the above operation of the molding machine that the mold must be inverted to permit drawing the pattern and if this operation is accomplished manually, considerable effort must be expended which not only retards production, but has a very detrimental effect upon the operator. It is, therefore, one of the essential features of this invention to provide simple and efficient mechanism for facilitating the inversion of the mold.

The mechanism employed herein for accomplishing the above results comprises a pair of levers 30 pivotally mounted at their lower ends as at 31 upon opposite sides of the base of the machine and having their upper ends pivotally connected to the levers 32 as at 33. The free ends of the levers 32 are provided with upwardly opening recesses 34 for receiving suitable pintles 35 projecting laterally outwardly from opposite sides of the pattern plate 21. The engagement of the pintles 35 with the recessed portions of the levers 32 is such as to permit unrestricted rotation of the pintles relative to the levers 32. Extending between the levers 32 and connected thereto is a tubular rod 36 having an arm 37 intermediate the ends thereof pivotally connected as at 38 to a fluid pressure cylinder 39 having a piston 40 therein permanently and rigidly fixed to the base of the machine through the intermediary of a rod 41. The cylinder 39 communicates at the upper end thereof with a source of fluid under pressure controlled by a suitable valve 42. The arrangement is such that the admission of air into the cylinder 39 above the piston 40 causes the cylinder 39 to move upwardly relative to the piston and since the cylinder is connected to the levers 32 as shown in Figure 3, it necessarily follows that the levers 32 will also be moved upwardly. Upward movement of the free ends of the levers 32 effects a corresponding movement of the mold assembly due to the fact that the pintles 35 upon opposite sides of the pattern plate are engaged within the recessed portions of the levers 32. The parts are so designed that when the cylinder has moved to its uppermost position relative to the piston 40, the molding device including the flask and pattern plate is supported a sufficient distance above the ram to permit the device to be rotated so as to position the pattern plate uppermost subsequent to the withdrawing of the latter from the mold. It will further be apparent from the above description that the fluid operated cylinder is connected to the levers 32 adjacent their pivotal connections 33 with the levers 30 so that the travel of the cylinder necessary to raise the mold the desired distance is reduced to the minimum.

In order to restrict upward movement of the mold by the arms 32 to a rectilinear path in alignment with the path of movement of the ram 12, I provide a guide 43 upon one side of the housing for the ram and extending parallel to the path of travel of the ram. The guide 43 is formed of a pair of flanged members 44 spaced apart a sufficient distance to receive a roller 45 carried by one end of an arm 46 having the opposite end secured to one of the levers 30 as at 47 and pivotally connected to one of the arms 32 by means of a link 48. In detail, it will be noted that opposite ends of the link 48 are pivotally connected respectively to the arm 32 aforesaid intermediate the pivotal connection of the latter with the mold and with the cylinder 39, and having the opposite end pivotally connected to the arm 46 adjacent the point of engagement of this arm with the guide 43. Thus, from the foregoing it will be apparent that movement of the free ends of the arms 32 carrying the mold is restricted to a path determined by the guide 43 and since the latter is arranged in predetermined relation to the path of travel of the ram, it follows that movement of the mold relative to its support is restricted to a predetermined path which in the present instance is the path of travel of the ram. In this connection it is to be further observed that during movement of the free ends of the arms as specified, the fulcrum or pivotal connections 33 for the opposite ends of the arms swing throughout an arc about the pivotal connections 31 as centers.

Referring now briefly to the operation of my improved mold inverting device, it will be apparent that after the sand in the mold has been completely compressed, as previously described, and the ram and swinging frame members 16 have been moved to the position shown in Figure 2, air is admitted to the cylinder 39 causing the latter to move the levers 32 upwardly and since the levers are connected to the pattern plate in the mold, the latter will also be moved upwardly. When the mold has been moved to its uppermost position relative to the ram, the said mold may be manually rotated about 180 degrees to position the pattern uppermost. The air in the cylinder 39 is then permitted to escape causing the mold to descend and engage the ram plate 13. Upon restoring the mold in its inverted position upon the support, the swinging frame is returned to its operative position and the ram is again moved upwardly, as previously described, to engage the members 19 with the pattern plate permitting the latter to be withdrawn from the mold. After the pattern has been withdrawn from the mold and ram has been returned to its lowermost position and the mold disposed of, the members 19 are disengaged from the pattern plate and the latter rotated within the recesses 34 to position the patterns uppermost, whereupon the pattern plate is returned by the arms 32 to its original position upon the ram in readiness for the next molding operation.

Thus, from the foregoing it will be observed that I have materially reduced the manual attention and handling of the mold heretofore necessary during the molding operation by a simple and economical mechanism which may be readily attached to a molding machine.

What I claim as my invention is:

1. In a molding machine, the combination with a reciprocable ram, of a squeezer plate arranged above the ram and cooperating therewith to compress a mold, a swinging frame supporting said squeezer plate, and means carried by said ram for engaging said frame to prevent undesired movement of the latter relative to the ram.

2. In a molding machine, the combination with a reciprocable ram, of a squeezer plate arranged above the ram and cooperating therewith to compress a mold, a swinging frame supporting said squeezer plate, and cooperating guide means upon the frame and ram slidably engaging each other during a portion of the movement of the ram to prevent swinging movement of the frame relative to the ram.

3. In a molding machine, the combination with a reciprocable ram, and a mold including a pattern and a flask supported upon the ram, of a swinging frame having a portion normally arranged above the ram, means upon the portion aforesaid of the frame for engaging the pattern during the descent of the ram to withdraw the pattern from the mold, and means carried by the ram and engageable with the swinging frame for locating the latter during the drawing operation.

4. In a molding machine, a reciprocable ram adapted to support a mold with a pattern plate therein, means pivotally engaging opposite sides of the pattern plate, means for actuating the means aforesaid for moving the mold and pattern plate away from the ram a sufficient distance to permit rotation of the mold and pattern about the said pivotal connection between the latter and first-named means to invert the mold and pattern, and means for controlling the operation of said first-mentioned means to effect the aforesaid movement of the mold and pattern in the path of travel of the ram.

5. In a molding machine, means for supporting a mold with a pattern therein, means pivotally engaging opposite sides of the pattern, power means for operating said second-mentioned means to move the mold and pattern away from the support a sufficient distance to permit rotating the mold and pattern about the pivotal connection between the latter and second-named means to invert the mold and pattern said power means subsequently operable to return the mold and pattern in its inverted position upon the support, and means for controlling the operation of said second-mentioned means to effect movement of the mold and pattern toward and from the ram in a predetermined rectilinear path.

6. In a molding machine, a support for a mold forming device, power means for moving the device in spaced relation to the support to permit inverting the mold including a pair of levers having their free ends pivotally connected to opposite sides of the device and fulcrumed at the opposite ends thereof, and means engageable with the levers adjacent the fulcrums thereof for moving the free ends of the levers and device carried thereby upwardly a sufficient distance to permit rotating the device to invert the mold, said means also operable to return the mold in its inverted position upon the support.

7. In a molding machine, a support for a mold forming device, means for automatically moving the device in spaced relation to the support to permit inverting the mold including a pair of levers having the free ends thereof adapted to be pivotally connected to opposite sides of the device and fulcrumed at the opposite ends thereof, fluid pressure means engageable with the levers at a point intermediate the ends thereof for moving the free ends of the levers and device carried thereby upwardly a sufficient distance to permit rotating the device to invert the mold, and means for restricting movement of the free ends of the levers to a predetermined path to maintain the device in predetermined relation to the support throughout the movement thereof.

8. In a molding machine, a support for a mold forming device having a pattern plate, a pair of levers adapted to be pivotally connected to opposite sides of the pattern plate for supporting the same, fulcrums for said levers, and mechanical means engaging the levers intermediate the ends thereof for moving the same together with the mold away from the support a sufficient distance to permit inverting the mold, said means also operable to return the mold in its inverted position upon the support, and means for restricting movement of the mold toward and from the support to a predetermined path.

9. In a molding machine, a support for a mold forming device, a pair of levers adapted to be pivotally connected to opposite sides of the device, shiftable fulcrums for said levers, power means connected to said levers intermediate the ends thereof for moving the latter together with the device away from the support a sufficient distance to permit inverting the mold and subsequently operable to return the mold in its inverted position to the support, and means for restricting movement of the free ends of the levers to a predetermined rectilinear path.

10. In a molding machine, a reciprocable ram adapted to support a mold forming device, a pair of levers having the free end portions adapted to be pivotally connected to opposite sides of the device, shiftable fulcrums for the opposite ends of the levers, power means connected to said levers intermediate the ends thereof for moving the free end portions of the levers together with the device away from the ram a sufficient distance to permit inverting the mold and subsequently operable to return the mold in its inverted position upon the ram, and means for guiding the travel of the free ends of the levers to restrict movement of the device to the path of travel of the ram.

11. In a molding machine, a reciprocable ram for supporting a mold, fluid pressure means for moving said mold away from the ram a sufficient distance to permit inverting the mold and for subsequently returning the mold in its inverted position upon the ram, and means for restricting movement of the mold toward and from the ram to the path of travel of the latter.

12. In a molding machine, a support for a mold forming device, a pair of levers having the free end portions thereof adapted to be pivotally connected to opposite sides of the device, shiftable fulcrums for the opposite ends of the levers, a member connecting said levers intermediate the ends thereof, power means engaging said member for moving the free end portions of the levers about their fulcrums and thereby effecting a movement of the device relative to the support, and means for restricting movement of the device to a predetermined path relative to the support.

13. In a molding machine, a support for a mold forming device, a pair of levers having the free end portions pivotally connected to opposite sides of the device, fulcrums for the opposite ends of the levers, and power means connected to said levers intermediate the ends thereof for moving the latter as a unit about their fulcrums and thereby effecting a movement of the device relative to its support.

14. In a molding machine, a support for a mold forming device, a pair of levers having the free ends adapted to be pivotally connected to the device at opposite sides thereof, shiftable fulcrums for the opposite ends of the levers, power means for moving said levers about their fulcrums and thereby effecting a movement of the device relative to its support, and means connected to one of the fulcrums aforesaid for restricting movement of the free ends of the levers to a predetermined path relative to the support.

15. In a molding machine, the combination with a ram adapted to support a mold forming device having a pattern plate, of means pivotally engageable with the pattern plate for rotatably supporting the device in spaced relation to the ram, and power means engaging the means aforesaid for moving the device away from the ram a sufficient distance to permit inverting the mold and for subsequently returning the inverted device to the ram.

16. In a molding machine, a support for a molding device, linkage pivotally engageable with opposite sides of the device for supporting the same in spaced relation to the support to permit inverting the mold, and power means for actuating said linkage to move the device relative to said support.

17. In a molding machine, a reciprocable ram for supporting a mold forming device, linkage pivotally connected to opposite sides of the device for supporting the same in spaced relation to the ram to permit inverting the mold, power means connected to the linkage for effecting movement of the mold forming device toward and away from the ram, and means engaging said linkage to insure movement of the device in a predetermined path relative to the ram.

In testimony whereof I affix my signature.

WILLIAM J. FIEGEL.